April 29, 1969 L. P. DAMRATOWSKI 3,440,806
SEPARATOR TUBE CAP

Filed Oct. 18, 1965 Sheet 1 of 2

INVENTOR.
LEONARD P. DAMRATOWSKI.
BY Raymond Curtin

ATTORNEY.

April 29, 1969  L. P. DAMRATOWSKI  3,440,806
SEPARATOR TUBE CAP
Filed Oct. 18, 1965
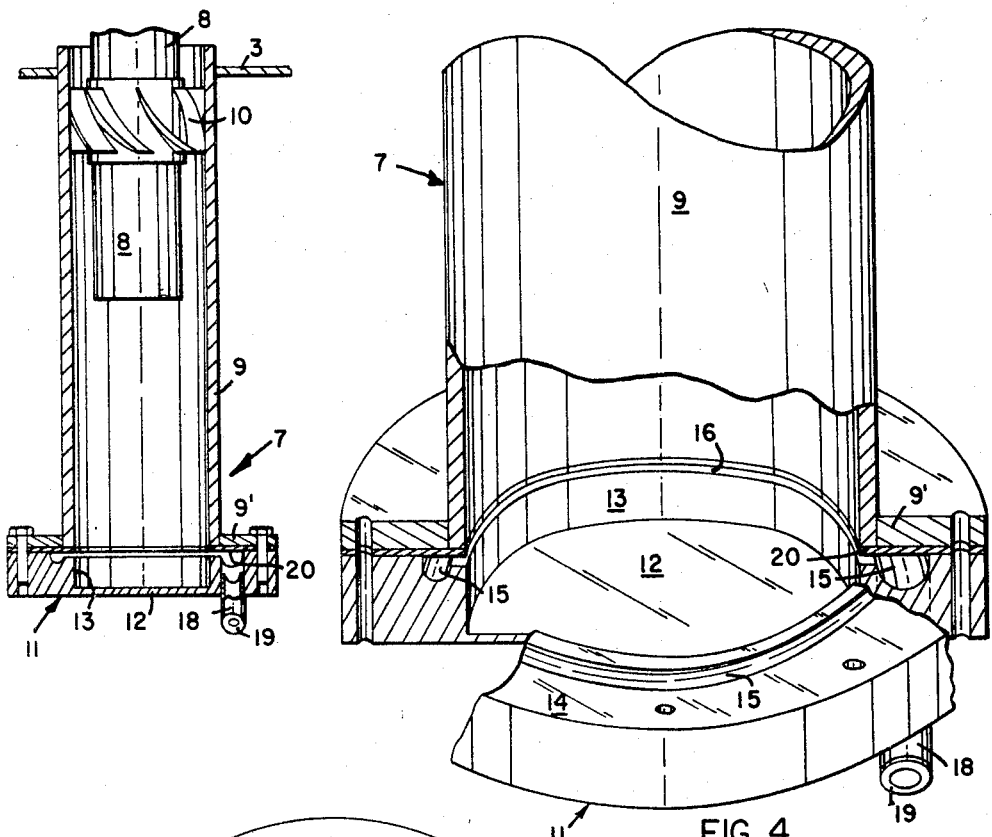
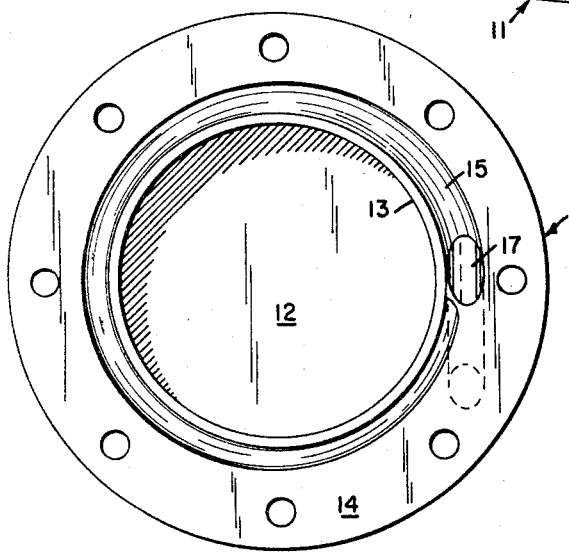
INVENTOR.
LEONARD P. DAMRATOWSKI
BY *Raymond Curtin*
ATTORNEY.

United States Patent Office 3,440,806
Patented Apr. 29, 1969

3,440,806
SEPARATOR TUBE CAP
Leonard P. Damratowski, Monroeville, Pa., assignor to Carrier Corporation, Syracuse, N.Y., a corporation of Delaware
Filed Oct. 18, 1965, Ser. No. 496,818
Int. Cl. B01d 45/16
U.S. Cl. 55—449                                                         1 Claim

ABSTRACT OF THE DISCLOSURE

A centrifugal separator for removing particulate matter from a gas stream employing an improved separator tube end cap having a particle collection scroll of increasing cross sectional area in the direction of particle movement to provide a smooth, non-turbulent flow of particles therein and prevent recirculation of particles therethrough to minimize clogging and erosion of the scroll walls.

---

This invention relates to centrifugal separators. More particularly, this invention relates to a centrifugal separator used for separating solid materials from a gas stream having the solid material entrained therein. Still more particularly, this invention relates to an improved end cap for the separator tubes used in conjunction with a centrifugal gas separator plant.

In many industrial processes such as are found in the steel or chemical industries, excessive amounts of solids-containing gases are given off as a waste product. These gases, when directed through a power turbine, provide a cheap source of power for driving compressors and like machines. However, the impurities in these gases, such as catalyst particles resulting from a chemical process, when entrained in the high velocity gas stream, impinge on the power turbine blades and rapidly erode said blades. To prevent this erosion, a centrifugal separator plant is placed in the gas line ahead of the power turbine to separate solid particles from the gas stream and provide essentially particle-free gas to the power turbine.

The centrifugal separator plant commonly used for this purpose is comprised of a number of small diameter tubular separators disposed within a casing having an inlet chamber to supply particle laden gas to the tubular separators, a clean gas chamber into which the clean gas from the tubular separators discharge and a particle collection chamber into which separated particles are exhausted from the base of the tubular separators. A tubular separator is ordinarily made up of two concentric tubes, the smaller, upper tube extending up into the clean gas chamber and down into the lower tube, the lower tube extending from the supply chamber down into the collection chamber. As stated, the small upper tube extends down into the lower tube for a short distance. Between the inner wall of the lower, outer tube and the outer wall of the upper, inner tube, spiral vanes are disposed so that when high velocity gas from the supply chamber enters the space between the outer and inner tubes of the tubular separator, the vanes cause the gas to be set in a spiral motion or vortex. The particles in the spirally moving gas stream are thrown out against the side of the outer, lower tube by centrifugal force and fall toward the bottom of the tube while the clean gas exhausts centrally upward into the inner tube, exiting into a clean gas collection chamber and then into the power turbine. The lower and outer tube has an appropriately sized and located exhaust slit near the bottom thereof through which the separated particles are discharged along with a small fraction of gas into the dust or particle collection chamber.

For a system employing multi-tubes fed from one common inlet flow annulus and discharging to a common collection annulus, equal flow per tube is desirable. The blow down flow employed to carry away the separated dust is a function of the bottom geometry of the separator cap and its magnitude a function of pressure drop. Prior art has employed a discharge slit, an annular passageway and a number of discharge tubes displaced at 90° to the bottom of the annular passageway to carry separated particles out of the passageway at a rate commensurate with other separator tubes in parallel.

With this construction, however, some of the separated particles, swirling around the passageway, do not exhaust out the discharge tube but continue swirling around the passageway, causing excessive erosion and eventually overloading the passageway, which in turn causes separated particles in the separator tube to remix with the clean gas.

It is therefore an object of this invention to provide an improved separator tube end cap which will utilize the spiral motion of the gases and separated particles in the separator tube to minimize recirculation of the separated particles, discourage clogging of the particle discharge passage by deposition of the separated particles therein, prevent excessive erosion of the end cap in the collection scroll annulus, and reduce separator tube pressure drop.

An additional object is to provide an end cap having means thereon to attach an orifice plate over the particle discharge opening to control flow through the separator tube which may be efficiently and economically replaced when worn due to the unavoidable erosion by the discharging particles.

This invention relates to an improved method for separating solid material from a gas stream having the solids entrained therein and an improved centrifugal separator used in separating solid materials from a gas stream having the solids entrained therein including a novel separator tube end cap. The end cap of this invention has an annular groove of constantly increasing cross section throughout its annular extent. The groove terminates at a discharge opening in the base portion of the cap. Thus, centrifugal force will cause the solid particles to be deposited in the said annular groove and the spirally moving gas will transmit the particles along the gradually increasing groove and out the discharge opening.

To provide for precise control of the flow through the separator tube, an orifice plate can be placed over the discharge opening or an extension thereof on the outside of said end cap. Since this orifice plate will be subject to some erosion by the discharging particles, an easily replaceable orifice plate is preferred.

To prevent any erosion of the flange on the end of the lower, outer tube, a replaceable wear plate may be inserted between the end cap flange and the tube flange.

The invention will be further described with reference to the accompanying drawing forming a part of this specification and showing by way of illustration one preferred embodiment wherein:

FIGURE 2 is a vertical sectional view through a separator tube employed in the centrifugal gas separator plant with the end cap attached thereto;

FIGURE 3 is a top view of the end cap; and

FIGURE 4 is a sectional perspective view of a separator tube with the end cap attached thereto.

Figure 1:
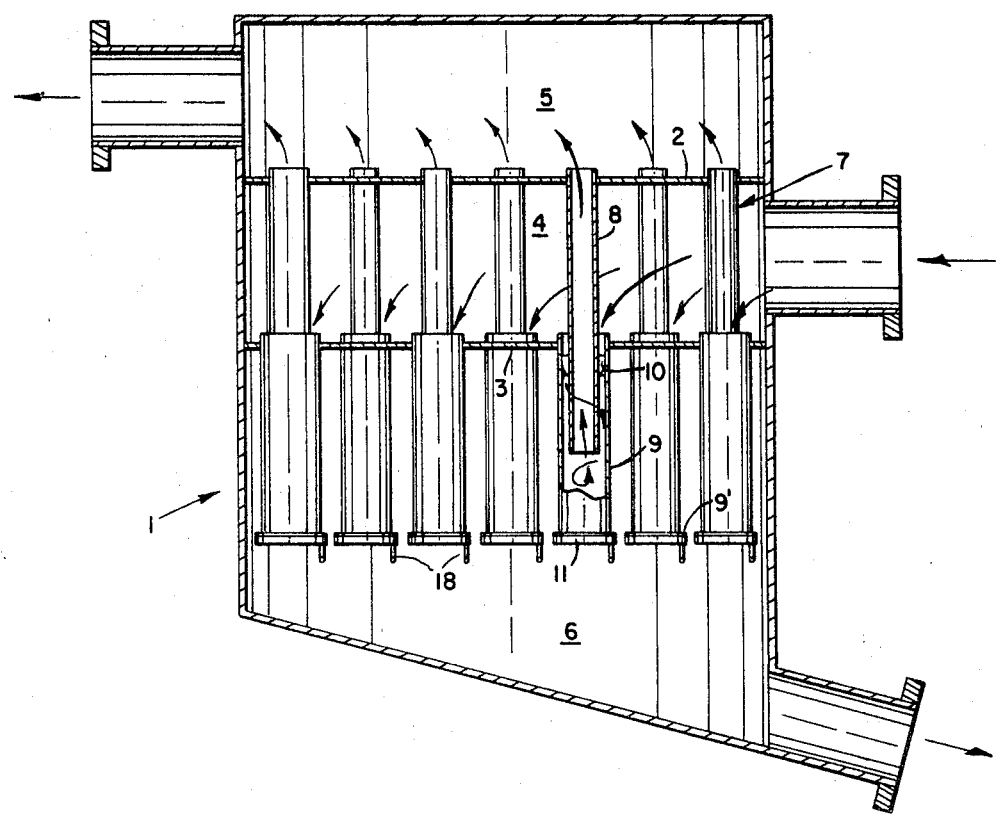
FIGURE 1 is a vertical sectional view of a centrifugal gas separator plant.

Referring to the attached drawings, there is shown a centrifugal gas separator plant 1 having therein an upper partition 2 and a lower partition 3, said partions defining a supply chamber 4 for the particle laden gas, a clean air chamber 5 and a particle collection chamber 6. Vertically disposed within said chambers are a multitude of tubular gas separators 7, said tubular gas separators having an inner elongated tubular body 8, an outer, elongated tubular body 9, swirl vanes 10 disposed between the inner tube 8 and the outer tube 9. Outer tube 9 is provided with an annular flange 9' formed thereon. To provide a closure on the lower end of tube 9, there is affixed thereto a base cap 11 including a base portion 12 having an upstanding annular wall portion 13 integrally formed thereon. The wall portion 13 includes a horizontal circular flange 14 and has an annular groove formed in the upper portion therefor, the groove including a cavity 15 of constantly increasing cross section throughout its annular extent. (The term "annular" is used to denote the general path of the groove. It should be understood that other geometric configurations are included as well, for example, an incomplete circular path, a circular path of increasing radius, etc.) The top of the wall portion 13 is relieved so that when cap 11 is affixed to the tube flange 9', the relieved portion of the upstanding wall 13 provides a bleed passage 16 between the interior of the cap 11 and the cavity 15. The cavity 15 terminates at a discharge opening 17. Attached to the end cap 11 over the discharge opening 17 is a short tubular member 18 which has an orifice plate 19 attached to the end thereof to control the pressure drop and flow between the entrance to the tubular gas separator 7 and the collection chamber 6.

Thus, the particle laden, high pressure gas enters the supply chamber 4, passes through the area defined between inner tube 8 and outer tube 9, over the spiral vanes 10 which causes the entering gas to swirl and accelerate, the swirl continuing throughout the length of tube 9 so as to create a vortex. The solid particles entrained in the gas stream are thrown to the outside of the gas column and the clean air in the center of the tube 9 is exhausted upward through inner tube 8 leaving a mixture of particles and a small quantity of gas swirling around the bottom of the separator. Due to the configuration of the bleed passage 16, the cavity 15 of constantly increasing cross section and the orifice plate 19, the cavity 15 is maintained at a pressure somewhat lower than the pressure in the tubular separator 7. This causes the swirling particles and a portion of the gas to be swept into the annular cavity. The swirling motion of the particle-gas mixture combined with the pressure differential between constantly increasing cross-sectional cavity 15 and the chamber 6 causes the particle-gas mixture to be transmitted along the cavity toward the discharge opening 17 in the base cap. Due to the constantly increasing cross-sectional area of the cavity 15 in the direction of swirl, the particle-gas mixture is transmitted along the cavity at a constant velocity which minimizes turbulence and pressure drop of the particle-gas mixture which in turn minimizes erosion of the cavity walls and discourages clogging of the cavity by the separted particles. After the particles reach the discharge opening 17, they are transmitted along the tubular member 18, through the hole in the orifice plate 19 into the collection chamber 6.

It might also be desirable to insert a wear plate 20 between the tube flange 9' and the base cap 11 to prevent erosion of the flange 10 which forms the upper surface of the cavity 15 and the bleed passage 16.

The base cap of the present invention provides a smooth flow of separated particles into and along the annular groove, through the discharge orifice into the collecting chamber of the separator. This results in very little recirculation of the separated particles and minimal erosion of the end cap, thus increasing cap life.

Another advantage of my present invention is that the pressure drop and separator tube flow is closely controlled by the orifice plate. This orifice plate is the main element subject to erosion and can be replaced when eroded at a fraction of the cost of a separator tube cap.

I claim:
1. A device for separating particulate matter from a gas stream having the particles entrained therein comprising
   a first elongated tubular body;
   a second elongated tubular body having a diameter smaller than said first elongated tubular body and co-axial therewith, said second body being disposed within the top portion of said first body;
   swirl means disposed within the space between the interior surface of said first body and the exterior surface of said second body to impart a swirling motion to the gas and particulate matter directed therethrough into the lower portion of said first tubular body to cause the particulate matter to swirl along the inner surface of said first tubular body and provide particle free gas in the central portion of said first body for transmittal through said second tubular body;
   a base cap affixed to the bottom end of said first tubular body serving as an end closure therefor, said base cap including
   a wall portion on the upper surface of said cap having a spiral groove therein of constantly increasing cross sectional area communicating throughout a major portion of its length with the interior of said first tubular body for passage of particulate matter and a small portion of gas from the first tubular body into said groove, said cap having a discharge opening formed therein, said discharge opening communicating with the large end of said spiral groove for discharge of particulate matter and gas from the groove.

References Cited
UNITED STATES PATENTS

| | | | |
|---|---|---|---|
| 3,149,941 | 9/1964 | Barnitz et al. | 55—386 |
| 3,318,073 | 5/1967 | Adkins | 55—204 |
| 2,069,483 | 2/1937 | Skajaa | 55—348 |
| 2,346,005 | 4/1944 | Bryson | 55—459 |
| 2,941,621 | 6/1960 | Dygert et al. | 55—344 |
| 3,264,806 | 8/1966 | Neumann | 55—346 |

FOREIGN PATENTS
594,576  11/1947  Great Britain.

HARRY B. THORNTON, *Primary Examiner.*
BERNARD NOZICK, *Assistant Examiner.*

U.S. Cl. X.R.
55—457; 209—144, 211; 210—512